United States Patent
Binion et al.

(10) Patent No.: US 10,410,291 B1
(45) Date of Patent: Sep. 10, 2019

(54) SYSTEMS AND METHODS FOR ANALYZING UNMANNED AERIAL MISSIONS

(71) Applicant: State Farm Mutual Automobile Insurance Company, Bloomington, IL (US)

(72) Inventors: Todd Binion, Bloomington, IL (US); Jennifer Criswell Kellett, Bloomington, IL (US); Jeremy Carnahan, Bloomington, IL (US); Matt Megyese, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 38 days.

(21) Appl. No.: 15/482,300

(22) Filed: Apr. 7, 2017

Related U.S. Application Data

(60) Provisional application No. 62/399,041, filed on Sep. 23, 2016, provisional application No. 62/383,127, filed on Sep. 2, 2016.

(51) Int. Cl.
G06Q 40/08 (2012.01)
G07C 5/00 (2006.01)
G01C 23/00 (2006.01)
B64C 39/02 (2006.01)

(52) U.S. Cl.
CPC ............. *G06Q 40/08* (2013.01); *G01C 23/00* (2013.01); *G07C 5/008* (2013.01); *B64C 39/024* (2013.01)

(58) Field of Classification Search
USPC ....................................................... 701/29.7
See application file for complete search history.

(56) References Cited

U.S. PATENT DOCUMENTS

| | | | |
|---|---|---|---|
| 8,543,261 B2 | 9/2013 | Anderson et al. | |
| 8,954,226 B1 | 2/2015 | Binion et al. | |
| 9,256,225 B2 | 2/2016 | Downey et al. | |
| 9,256,994 B2 | 2/2016 | Downey et al. | |
| 9,311,760 B2 | 4/2016 | Downey et al. | |
| 9,346,543 B2 | 5/2016 | Kugelmass | |
| 9,346,544 B2 | 5/2016 | Kugelmass | |
| 9,406,237 B2 | 8/2016 | Downey et al. | |
| 9,542,849 B1 | 1/2017 | Bertram et al. | |
| 9,607,522 B2 | 3/2017 | Downey et al. | |
| 2015/0187224 A1 | 7/2015 | Moncrief et al. | |
| 2015/0336671 A1 | 11/2015 | Winn et al. | |
| 2016/0140851 A1 | 5/2016 | Levy et al. | |
| 2016/0216711 A1 | 7/2016 | Srivastava et al. | |
| 2016/0225263 A1* | 8/2016 | Salentiny | G08G 5/003 |
| 2016/0252902 A1 | 9/2016 | Rodas | |
| 2016/0260331 A1 | 9/2016 | Salentiny et al. | |
| 2016/0307447 A1 | 10/2016 | Johnson et al. | |
| 2017/0021925 A1 | 1/2017 | Weller et al. | |
| 2017/0024746 A1 | 1/2017 | Henry | |
| 2017/0081026 A1 | 3/2017 | Winn et al. | |
| 2017/0083979 A1* | 3/2017 | Winn | G06Q 40/08 |

\* cited by examiner

*Primary Examiner* — Maceeh Anwari
(74) *Attorney, Agent, or Firm* — Armstrong Teasdale LLP

(57) ABSTRACT

A system for determining drone operation rules configured to (i) receive a plurality of telematics data from a plurality of missions; (ii) analyze the plurality of telematics data to determine one or more mission trends; and (iii) determine one or more rules based upon the one or more mission trends.

18 Claims, 10 Drawing Sheets

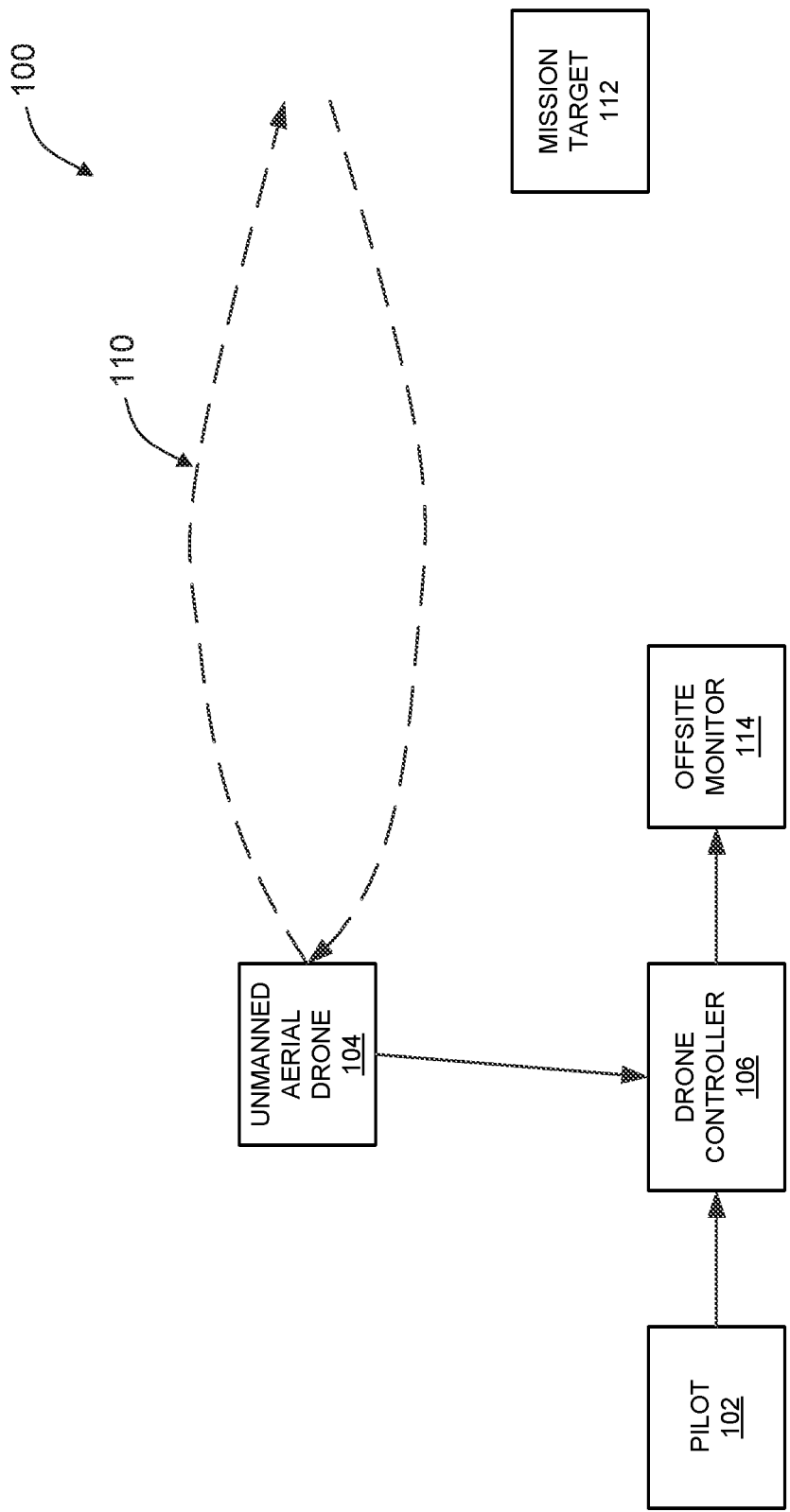

SYSTEMS AND METHODS FOR ANALYZING UNMANNED AERIAL MISSIONS

RELATED APPLICATIONS

This application claims priority to U.S. Provisional Patent Application No. 62/383,127, filed Sep. 2, 2016, entitled "SYSTEMS AND METHODS FOR ANALYZING UNMANNED AERIAL MISSIONS" and U.S. Provisional Patent Application No. 62/399,041, filed Sep. 23, 2016, the entire contents and disclosure of which are hereby incorporated by reference herein in their entirety.

FIELD OF THE INVENTION

The present disclosure relates to analyzing unmanned aerial missions and, more particularly, to a network-based system and method for determining an amount of risk associated with different types of missions and environmental conditions surrounding unmanned aerial missions.

BACKGROUND

Unmanned aircraft, such as aerial drones (also known as unmanned aerial systems or UAS), may be operated manually or automatically. These drones may be sent on missions for commercial purposes, such as aerial photography. However, there is always a risk of an accident with the drone that may cause physical injury to the drone, people, and/or property. These accidents may be caused by operator error, vehicle malfunctions, environmental conditions (i.e., weather, visibility, and location), external objects, and/or any combination of the above. However, there is not a significant amount of information about the different variables that may affect the operation of unmanned aircraft, which may make it difficult to accurately determine the insurance coverage needed to cover such aircraft while performing such missions. There exists a need to collect and collate data about unmanned aerial missions for more accurate insurance projections.

BRIEF SUMMARY

The present embodiments may relate to systems and methods for analyzing unmanned aerial missions. An unmanned aerial mission monitoring system, as described herein, may include an unmanned aerial mission monitoring ("UAMM") computer device. The UAMM computer device may be configured to (i) store the plurality historical mission data based upon a plurality of unmanned aerial missions, (ii) determine one or more business rules based upon the plurality of historical mission data, (iii) receive, from a user, pre-mission data for a planned unmanned aerial mission, (a) wherein the planned unmanned aerial mission is a commercial mission, (b) wherein the pre-mission data includes a type of mission, and (c) wherein the pre-mission data may include, but is not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information, (iv) calculate a risk for the unmanned aerial mission based, at least in part on, the pre-mission data and the plurality of historical mission data, (v) compare the pre-mission data to the plurality of historical mission data to determine one or more missions of the plurality of historical mission data of the same type of mission as the pre-mission data, (vi) determine an insurance policy (and/or a usage-based or mission-based insurance premium or rate) based upon the pre-mission data, the one or more business rules, and/or a plurality of historical mission data, the determined one or more missions, (vii) transmit, to the user, the insurance policy, (viii) receive acceptance of the insurance policy from the user, (ix) receive, from a computer device associated with a telematics monitoring service, a plurality of telematics information from the unmanned aerial mission, wherein the plurality of telematics information may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and/or data about any relevant objects external to the drone, (x) generate a scenario model of a drone accident based upon the plurality of telematics data, (xi) generate at least one insurance claim form based upon the scenario model, (xii) update at least one of the one or more business rules and the plurality of historical mission data based upon the plurality of telematics information, (xiii) determine one or more safe operating guidelines based upon the plurality of historical mission data, (xiv) compare the plurality of telematics information to the one or more safe operating guidelines to determine if there were any violations of the safe operating guidelines during the unmanned aerial mission, and/or (xv) adjust a future insurance policy for the user based upon if there were any determined violations. The UAMM computing device may include additional, less, or alternate functionality, including that discussed elsewhere herein.

At least one advantage of this system is that because the UAMM server receives the actual telematics information from unmanned aerial drone missions, the UAMM server may analyze the data to accurately determine the risk of each mission after the fact. This may allow the UAMM server to use the information about past missions to calculate the risk for a future mission. This reduces the reliance on potentially faulty human recollection and guesswork. Furthermore, the use of actual telematics data allows for quicker generation of insurance policies based upon past missions. Another advantage of the system is that by providing accurate information about the past and future unmanned aerial missions, UAMM server may constantly update its database of information and business rules based upon new information. This may reduce the chance of error in calculation and evolve as the industry evolves and more information becomes available.

In one aspect, a computer system for analyzing unmanned aerial missions may be provided. The computer system may include at least one processor (and/or associated transceiver) in communication with at least one memory device. The at least one processor (and/or associated transceiver) may be configured or programmed to: (1) receive, from a user, pre-mission data for a planned unmanned aerial mission; (2) determine an insurance policy (which may include a usage-based or mission-based insurance premium or rate) based upon the pre-mission data, one or more business rules, and/or a plurality of historical mission data; (3) transmit, to the user, the insurance policy; (4) receive acceptance of the insurance policy from the user; (5) receive a plurality of telematics information from the unmanned aerial mission; and/or (6) update at least one of the one or more business rules and the plurality of historical mission data based upon the plurality of telematics information to facilitate quickly and accurately processing insurance policies for unmanned aerial missions. The computer system may have additional, less, or alternate functionality, including that discussed elsewhere herein.

In another aspect, a computer-based method analyzing unmanned aerial missions may be provided. The method may be implemented on an unmanned aerial mission monitoring ("UAMM") server that includes at least one processor (and/or associated transceiver) in communication with at least one memory device. The method may include: (1) receiving, from a user, pre-mission data for a planned unmanned aerial mission; (2) determining, by the UAMM server, an insurance policy (and/or a usage-based or mission-based insurance premium or rate) based upon the pre-mission data, one or more business rules, and a plurality of historical mission data; (3) transmitting, to the user, the insurance policy; (4) receiving, at the UAMM server, acceptance of the insurance policy from the user; (5) receiving, at the UAMM server, a plurality of telematics information from the unmanned aerial mission; and (6) updating, by the UAMM server, at least one of the one or more business rules and the plurality of historical mission data based upon the plurality of telematics information and/or (7) generating, by the UAMM server, at least one insurance claim form based upon the scenario model to facilitate quickly and accurately processing insurance policies for unmanned aerial missions. The computer method may have additional, less, or alternate functionality, including that discussed elsewhere herein.

In yet another aspect, at least one non-transitory computer-readable storage media having computer-executable instructions embodied thereon may be provided. When executed by at least one processor, the computer-executable instructions cause the processor (and/or an associated transceiver) to: (1) receive, from a user, pre-mission data for a planned unmanned aerial mission; (2) determine an insurance policy (and/or a usage-based or mission-based insurance premium or rate) based upon the pre-mission data, one or more business rules, and/or a plurality of historical mission data; (3) transmit, to the user, the insurance policy; (4) receive acceptance of the insurance policy from the user; (5) receive a plurality of telematics information from the unmanned aerial mission; and/or (6) update at least one of the one or more business rules and the plurality of historical mission data based upon the plurality of telematics information to facilitate quickly and accurately processing insurance policies for unmanned aerial missions. The computer-executable instructions may direct additional, less, or alternate functionality, including that discussed elsewhere herein.

In another aspect, a computer system for determining drone operation rules may be provided. The computer system may include at least one processor in communication with at least one memory device. The at least one processor may be configured or programmed to: (1) receive a plurality of telematics data from a plurality of missions; (2) analyze the plurality of telematics data to determine one or more mission trends; and (3) determine one or more rules based upon the one or more mission trends to facilitate accurately determining operational procedures for drone missions. The computer system may have additional, less, or alternate functionality, including that discussed elsewhere herein.

In another aspect, a computer-based method for determining drone operation rules may be provided. The method may be implemented on an unmanned aerial mission monitoring ("UAMM") server that includes at least one processor in communication with at least one memory device. The method may include: (1) receiving, at the UAMM server, a plurality of telematics data from a plurality of missions; (2) analyzing, by the UAMM server, the plurality of telematics data to determine one or more mission trends; and (3) determining, by the UAMM server, one or more rules based upon the one or more mission trends to facilitate accurately determining operational procedures for drone missions. The computer method may have additional, less, or alternate functionality, including that discussed elsewhere herein.

In yet another aspect, at least one non-transitory computer-readable storage media having computer-executable instructions embodied thereon may be provided. When executed by at least one processor, the computer-executable instructions cause the processor to: (1) receive a plurality of telematics data from a plurality of missions; (2) analyze the plurality of telematics data to determine one or more mission trends; and (3) determine one or more rules based upon the one or more mission trends to facilitate accurately determining operational procedures for drone missions. The computer-executable instructions may direct additional, less, or alternate functionality, including that discussed elsewhere herein.

In a further aspect, a computer system for calculating risk, and/or generating policies or usage-based premiums, rates, or discounts for unmanned aerial missions is provided. The computer system may include at least one processor in communication with at least one memory device. The at least one processor may be programmed to (1) receive or retrieve pre-mission data for a planned unmanned aerial mission; (2) identify an operator associated with the planned unmanned aerial mission based upon the pre-mission data; (3) receive or retrieve historical mission data associated with the operator; (4) calculate drone collision risk, or a risk level for the planned unmanned aerial mission based upon (i) the retrieved historical mission data, and (ii) the pre-mission data; and/or (5) generate a usage-based (or mission-based) rate, discount, or premium, and/or insurance policy for the planned unmanned aerial mission based upon (i) the retrieved historical mission data associated with the drone operator, (ii) the pre-mission data (which may include mission characteristics, such as type of flight, length of flight by time and/or distance, area covered by flight (location), weather and wind conditions, type of payload (if any), type and age of drone, etc.), and/or (iii) risk or risk level calculated for the aerial mission. The computer system may have additional, less, or alternate functionality, including that discussed elsewhere herein.

In yet a further aspect, a computer-based method for calculating drone collision risk and/or generating policies or usage-based premiums, rates, or discounts for unmanned aerial missions may be provided. The computer-implemented method may be implemented on an unmanned aerial mission monitoring ("UAMM") server that includes at least one processor in communication with at least one memory device. The method may include (1) receiving, from a user (or retrieving from a memory unit), pre-mission data for a planned unmanned aerial mission; (2) identifying, by the UAMM server, an operator associated with the planned unmanned aerial mission based upon the pre-mission data; (3) retrieving, from the memory, historical mission data associated with the operator; (4) calculating, by the UAMM, a mission risk or drone collision risk for the planned unmanned aerial mission based upon (i) the retrieved historical mission data associated with the drone operator, and (ii) the pre-mission data; and/or (5) generating, by the UAMM, an insurance policy or usage-based (or mission-based) premium, rate, or discount for the planned unmanned aerial mission based upon (i) the retrieved historical mission data associated with the drone operator, (ii) the pre-mission data, and/or (iii) calculated mission risk. The method may include additional, less, or alternate functionality, including that discussed elsewhere herein.

In still a further aspect, at least one non-transitory computer-readable storage media having computer-executable instructions embodied thereon is provided. Wherein when executed by at least one processor, the computer-executable instructions cause the processor to (1) receive, from a user (or otherwise retrieve), pre-mission data for a planned unmanned aerial mission; (2) identify an operator associated with the planned unmanned aerial mission based upon the pre-mission data; (3) receive or retrieve historical mission data associated with the operator; (4) calculating a risk level, or risk of drone collision for the planned unmanned aerial mission based upon (i) the retrieved historical mission data associated with the operator, and (ii) the pre-mission data; and/or (5) generating an insurance policy or usage-based (or mission-based) rate, premium, or discount for the planned unmanned aerial mission based upon (i) the retrieved historical mission data associated with the operator, (ii) the pre-mission data, and/or (iii) the risk level, or risk of drone collision calculated for the mission. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 1 illustrates a schematic diagram of an exemplary unmanned aerial mission.

Figure 2A:
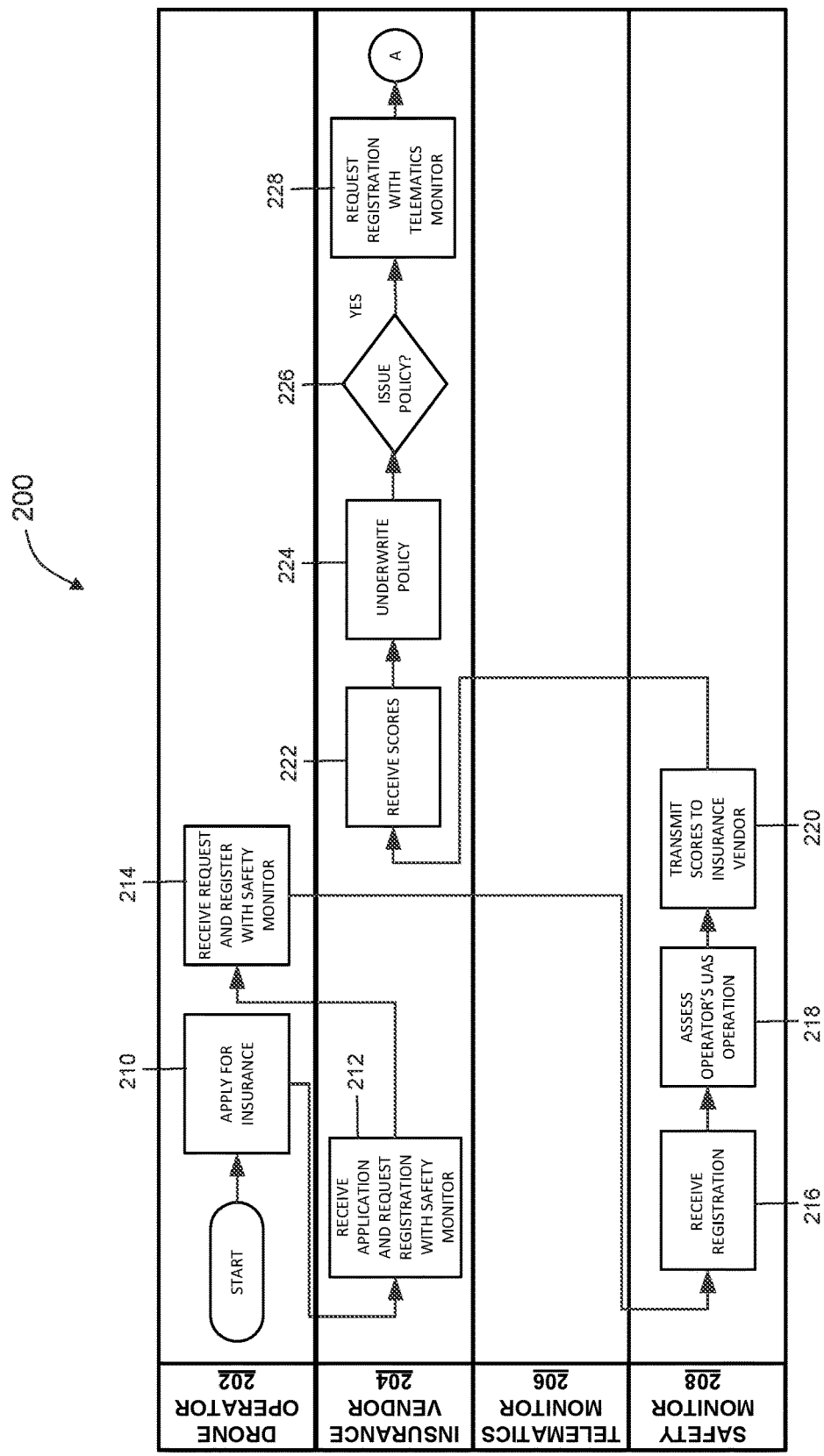
FIGS. 2A and 2B illustrate a flow chart of an exemplary process of analyzing unmanned aerial missions for insurance purposes, such as of the unmanned aerial mission shown in FIG. 1.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for analyzing unmanned aerial missions and determining an amount of risk associated with different types of missions and environmental conditions surrounding unmanned aerial missions. In an exemplary embodiment, the process is performed by an unmanned aerial mission monitoring ("UAMM") computer device, also known as an unmanned aerial mission monitoring ("UAMM") server.

An unmanned aerial mission is performed by an unmanned aerial vehicle (also known as unmanned aerial system (UAS) or a drone). The unmanned aerial vehicle may be a powered, aerial vehicle that does not carry a human operator, uses aerodynamic forces to provide vehicle lift. The UAS may fly autonomously or be piloted remotely. In some embodiments, the UAS may carry a payload. In some embodiments, the UAS may be a fixed-wing aircraft. In other embodiments, the UAS may be a rotorcraft.

In some embodiments, a pilot may remotely control the UAS through the use of a drone controller. Drone controller may be a computer device capable of communicating with the UAS to issue commands. In some embodiments, the drone controller receives telemetry data from the UAS while in flight. In other embodiments, the drone controller receives data from the UAS after UAS has landed.

In the exemplary embodiment, the UAMM server may receive pre-mission data for a planned unmanned drone mission. The UAMM server may receive the pre-mission data from a user computer device associated with a drone operator. In the exemplary embodiment, the mission may be a commercial mission, such as an agriculture survey. The pre-mission data includes information, such as, but not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information.

In the exemplary embodiment, the UAMM server determines an insurance policy based upon the pre-mission data, one or more business rules, and a plurality of historical mission data. In the exemplary embodiment, the UAMM server may store a plurality of mission data about past missions in a database. When determining an insurance policy, the UAMM server may access the plurality of historical mission data. The UAMM server may compare the pre-mission data to the plurality of historical mission data to determine one or more missions of the same type of mission as that of the planned mission. In some embodiments, the UAMM server may just compare the stored mission types to the mission type provided in the planned mission data. In other embodiments, the UAMM server may determine the mission type for planned mission from the pre-mission data, where the UAMM server may profile the mission into a mission type based upon a plurality of data fields included in the pre-mission data. In some embodiments, the UAMM server may determine similar missions in the plurality of historical mission data to planned mission based upon other information in pre-mission data. In still further embodiments, the UAMM server may determine different sections of different missions to be similar to planned mission.

The UAMM server may also store a plurality of business rules. These business rules assist the UAMM server in determining the proper insurance policy (and/or a usage-based or mission-based insurance premium or rate) for a planned mission. In some embodiments, the UAMM server may have determined the one or more business rules based upon the plurality of historical mission data. In some embodiments, the UAMM server may also calculate a risk for the planned mission based at least in part on the pre-mission data and the plurality of historical missions. In these embodiments, the UAMM server may also use the calculated risk in determining an insurance policy.

In the exemplary embodiment, the UAMM server transmits the insurance policy (and/or a usage-based or mission-based insurance premium or rate) to the drone operator for approval. The UAMM server may receive acceptance of the insurance policy (and/or a usage-based or mission-based insurance premium or rate) from the drone operator. The UAMM server may then issue the insurance policy to the drone operator for the planned mission.

In the exemplary embodiment, the UAMM server receives a plurality of telematics information from the mission. In some embodiments, the UAMM server receives the telematics information from a telematics monitor via a telematics monitor computer device. The telematics information may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

In the exemplary embodiment, the UAMM server updates at least one of the one or more business rules and the plurality of historical data based upon the plurality of telematics information. For example, the UAMM server may store the pre-mission data, the insurance policy, and the plurality of telematics information in the database with the plurality of historical data. In this example, the UAMM server may categorize the data based upon differences between the pre-mission data and the telematics data. In some embodiments, the UAMM server may also determine an updated risk for the mission based upon how the mission turned out. The UAMM server may also change, delete, and/or add one or more business rules based upon one or more of the telematics information, the pre-mission data, the insurance policy, the plurality of historical information, and/or a comparison of one or more of the above.

In some embodiments, the UAMM server may also determine one or more safe operating guidelines based upon the plurality of historical mission data. The safe operating guidelines may be rules of operating an unmanned aerial system or suggestions for how to operate an unmanned aerial system in a safe manner. For example, the operating guidelines may include a minimum safe distance to operate a UAS from power lines. The operating guidelines may also include environmental features to be aware of, such as suggested methods of operation in different weather conditions. In these embodiments, the UAMM server may determine the safe operating guidelines based upon accidents and their causes that are listed in the plurality of historical mission data.

In some further embodiments, the UAMM server may analyze the plurality of telematics information to determine that the pilot and the UAS complied with the safe operating guidelines during the mission. The UAMM server may determine one or more violations of the safe operating guidelines that occurred during the mission. In some embodiments, the UAMM server may determine a severity for each of the violations. In still further embodiments, the UAMM server may use the violations and/or severities to determine a future insurance policy for the drone operator associated with that mission.

In some embodiments, the UAMM server may use the plurality of telematics information to generate a scenario model of a drone accident that occurred. Furthermore, the UAMM server may generate at least one insurance form based upon the scenario model. In these embodiments, the UAMM server retrieves one or more stored blank claim forms, such as from the database. The UAMM server may then populate one or more of the blank fields of the retrieved blank forms based upon the scenario model. Based upon the completeness of the stored scenario model, the UAMM server may be able to fill out multiple forms and describe the accident in detail. The UAMM server may also be able to determine one or more damages that the UAS would have incurred in the drone accident. The UAMM server may also be able to estimate a cost of repairs or replacement.

At least one of the technical problems addressed by this system may include: (i) improving speed and accuracy of issuing an insurance policy for an unmanned aerial mission; (ii) improving the speed and accuracy of reconstructing a drone accident scenario; (iii) constantly improving the accuracy of data used to make insurance decisions about drone missions; and/or (iv) determining safe operating guidelines for unmanned aerial missions.

The methods and systems described herein may be implemented using computer programming or engineering techniques including computer software, firmware, hardware, or any combination or subset thereof, wherein the technical effects may be achieved by performing at least one of the following steps: (a) receiving, from a user, an unmanned aerial mission monitoring ("UAMM") server, pre-mission data for a planned unmanned aerial mission; (b) determining, by the UAMM server, an insurance policy based upon the pre-mission data, one or more business rules, and a plurality of historical mission data; (c) transmitting, to the user, the insurance policy; (d) receiving, at the UAMM server, acceptance of the insurance policy from the user; (e) receiving, at the UAMM server, a plurality of telematics information from the unmanned aerial mission; and (f) updating, by the UAMM server, at least one of the one or more business rules and the plurality of historical mission data based upon the plurality of telematics information and/or (7) generating, by the UAMM server, at least one insurance claim form based upon the scenario model to facilitate quickly and accurately processing insurance policies for unmanned aerial missions.

Additional technical effects may be achieved by performing at least one of the following steps: (a) receiving, at a unmanned aerial mission monitor ("UAMM") server, a plurality of telematics data from a plurality of missions; (2) analyzing, by the UAMM server, the plurality of telematics data to determine one or more mission trends; and (3) determining, by the UAMM server, one or more rules based upon the one or more mission trends to facilitate accurately determining operational procedures for drone missions.

Exemplary Unmanned Aerial Mission

FIG. 1 depicts a view of an exemplary unmanned aerial mission 100. In some embodiments, unmanned aerial vehicle 104 (also known as unmanned aerial system (UAS) or a drone) may be a powered, aerial vehicle that does not carry a human operator, uses aerodynamic forces to provide vehicle lift. UAS 104 may fly autonomously or be piloted remotely. In some embodiments, UAS 104 may carry a payload. In some embodiments, UAS 104 may be a fixed-wing aircraft. In other embodiments, UAS 104 may be a rotorcraft.

In some embodiments, a pilot 102 may remotely control UAS 104 through the use of a drone controller 106. Drone controller 106 may be a computer device capable of communicating with UAS 104 to issue commands. In some embodiments, drone controller 106 receives telemetry data from UAS 104 while in flight. In other embodiments, drone controller 106 receives data from UAS 104 after UAS 104 has landed.

During unmanned aerial mission 100, UAS 104 may fly along a flight path 110 to a mission target 112. In the exemplary embodiment, UAS 104 may also fly along flight path 110 back to a starting point. In one embodiment, unmanned aerial mission 100 is an aerial photography mission, such as for a real estate company. UAS 104 flies over mission target 112, which may be a house that is to be listed for sale, and takes pictures of the house/mission target 112. Other example missions may be, but are not limited to, aerial crop surveys, search and rescue, inspection of power lines and pipelines, counting wildlife, delivering medical supplies to otherwise inaccessible regions, product delivery, detection of illegal hunting, reconnaissance operations, environment monitoring, forest fire detection and monitoring, surveillance, coordinating humanitarian aid, plume tracking, land surveying, fire and large-accident investigation, landslide measurement, illegal landfill detection, 3D mapping, construction, crowd monitoring, and news gathering.

In some embodiments, drone controller 106 may be in communication with an offsite monitor 114. In these embodiments, drone controller 106 may download information received from UAS 104 and/or other information about mission 100 to offsite monitor 144 for future analysis. In some of these embodiments, offsite monitor 114 may be a service that monitors missions 100. In other embodiments, UAS 104 may transmit data to offsite monitor 114 directly.

In the exemplary embodiment, UAS 104 may also include one or more sensors (not shown). The one or more sensors provide information about UAS 104 and its surroundings. In the exemplary embodiment, UAS 104 may transmit this data to drone controller 106 to assist pilot 102 in the operation of UAS 104. In some embodiments, the sensor data may be telemetry data.

While UAS 104 may be an aircraft in the exemplary embodiment, in other embodiments, other types of unmanned vehicles may perform missions, such as, but not limited to, ground craft and watercraft unmanned vehicles.

Exemplary Process for Analyzing Unmanned Aerial Missions for Insurance Purposes

Figure 2B:
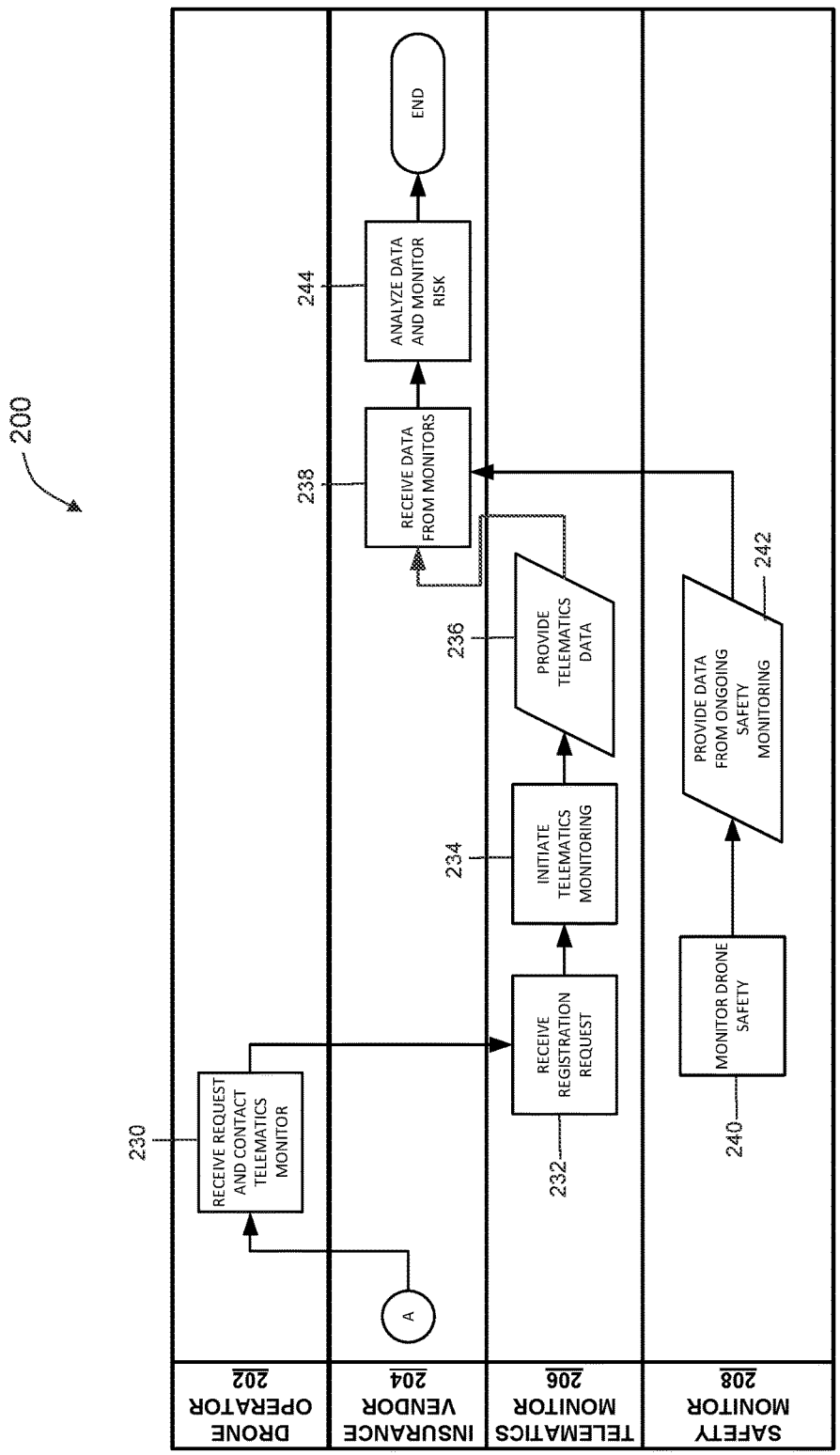

FIGS. 2A and 2B illustrate a flow chart of an exemplary process 200 of analyzing unmanned aerial missions for insurance purposes, such as of the unmanned aerial mission 100 shown in FIG. 1.

Figure 4:
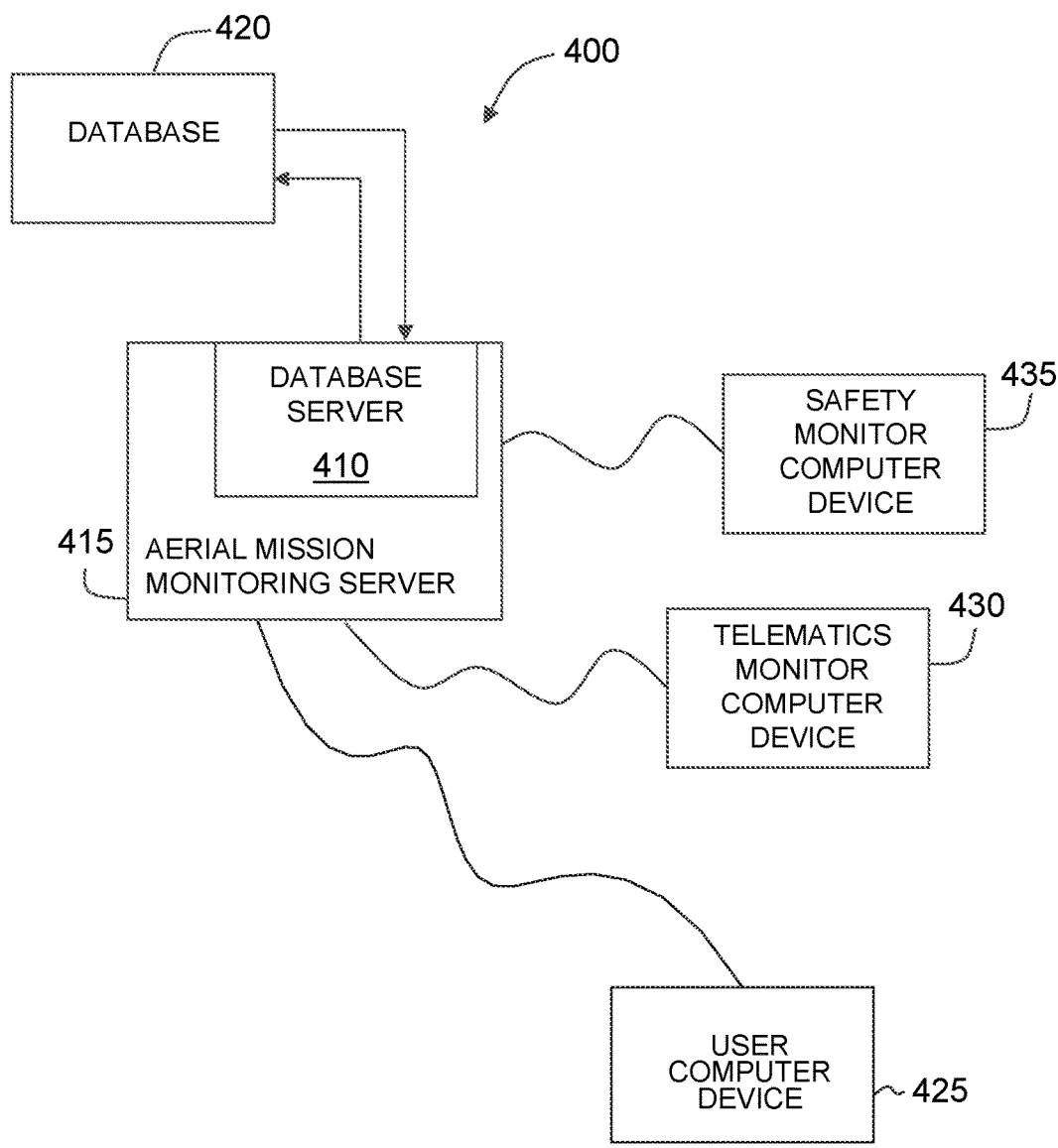
FIG. 4 illustrates a simplified block diagram of an exemplary computer system for implementing the process shown in FIGS. 2A and 2B.

In the exemplary embodiment, a drone operator 202 may be associated with a user computer device 425 (shown in FIG. 4). In the exemplary embodiment, drone operator 202 may be an individual associated with one or more unmanned aerial systems 104 (shown in FIG. 1). For example, drone operator 202 may be associated with an aerial photography business. In some embodiments, drone operator 202 may be an actual pilot of UAS 104. In other embodiment, drone operator 202 may be associated with one or more pilots 102 (shown in FIG. 2), who actually operate UAS 104.

In the exemplary embodiment, an insurance vendor 204 may underwrite and/or issue insurance policies for unmanned aerial missions 100. In the exemplary embodiment, insurance vendor 204 may be associated with unmanned aerial mission monitoring ("UAMM") computer device 415 (shown in FIG. 4). UAMM computer device 415 may also be known as UAMM server 415.

In the exemplary embodiment, telematics monitor 206 may be associated with telematics monitor computer device 430 (shown in FIG. 4). Telematics monitor 206 may also be associated with offsite monitor 114 (shown in FIG. 1). In some embodiments, telematics monitor 206 may be a third party vendor that provides a monitoring service for telemetry and other information collected by UAS 104. In some embodiments, telematics monitor 206 may collect data directly from UAS 104 or through drone controller 106 to prevent drone operator 202 or pilot 102 from altering any data.

In the exemplary embodiment, safety monitor 208 may be associated with safety monitor computer device 435 (shown in FIG. 4). Safety monitor 208 may also be associated with offsite monitor 114 (shown in FIG. 1). In some embodiments, safety monitor 208 may be a third party vendor that provides a monitoring service to determine the safety record of drone operator 202. Safety monitor 208 may receive data about drone operator 202 from a plurality of sources to determine whether drone operator 202 operates within required safety guidelines and the level of safety under which drone operator 202 operates. In some embodiments, safety monitor 208 may also receive data from drone controller 106 or UAS 104.

In the exemplary embodiment, drone operator 202 may apply 210 for insurance for any future, planned unmanned aerial mission 100. In the exemplary embodiment, drone operator 202 may use user computer device 425 to communication with insurance vendor 204 through UAMM server 415. UAMM server 415 receives 212 the registration request. In the exemplary embodiment, the registration request includes information about the future, planned unmanned aerial mission 100, such as, but not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information. The registration request may also include any other information that UAMM server 415 requires to issue a policy and to determine whether or not to issue said policy.

In the exemplary embodiment, UAMM server 415 may request 212 that drone operator 202 registers with safety monitor 208. Drone operator 202 receives 214 the request and registers 214 with safety monitor 206. In some embodiments, UAMM server 415 may communicate a plurality of potential safety monitors 208 to drone operator 202 that would be acceptable. In the exemplary embodiment, drone operator 202 may use user computer device 425 to communication with safety monitor 208 through safety monitor computer device 435. Safety monitor 208 receives 216 registration information from drone operator 202. In the exemplary embodiment, safety monitor 208 may assess and score 218 drone operator 202 based upon the drone operator's past history operating UAS 104. In some embodiments, safety monitor 208 may use information included in drone operator's registration information. In other embodiments, safety monitor 208 may use information from other sources, such as, but not limited to, organizations that drone operator 202 is a member of, weather reports and forecasts, past incident reports associated with drone operator, and information about one or more pilots 102 associated with drone operator 202. Safety monitor 208 transmits 220 the scores to UAMM server 415.

In the exemplary embodiment, UAMM server 415 receives 222 the scores. UAMM 415 may underwrite 224 a policy based upon the scores and the information provided in the application. Based upon the results of the underwriting, UAMM server 415 may determine 226 whether or not to issue a policy to drone operator 202. In the exemplary embodiment, UAMM server 415 may request 228 that drone operator 202 registers with a telematics monitor 206. In some embodiments, UAMM server 415 may communicate a plurality of potential telematics monitors 206 to drone operator 202 that would be acceptable.

In the exemplary embodiment, drone operator 202 receives the request and contacts 230 a telematics monitor 206. In the exemplary embodiment, drone operator 202 may use user computer device 425 to communication with telematics monitor 206 through telematics monitor computer device 430. Telematics monitor 206 receives 232 the registration request, including registration information. Telematics monitor 206 may initiate 234 monitoring of the telemetry of UAS 104. In some embodiments, telematics monitor 206 receives telemetry data directly from UAS 104. In other embodiments, telematics monitor 206 receives telemetry data from drone controller 106. In still further embodiments, telematics monitor 206 receives telemetry data from both UAS 104 and drone controller 106. Telemetric data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

In the exemplary embodiment, telematics monitor 206 may provide 236 collected telematics data to UAMM server 415. UAMM server 415 may receive 238 data from multiple monitors. In the exemplary embodiment, safety monitor 208 may monitor 240 drone safety as practiced by drone operator 202. Safety monitor 208 may provide 242 the data from the ongoing safety monitoring to UAMM server 415. In the exemplary embodiment, UAMM server 415 analyzes 244 the data and monitors the risk from drone operator 202. In the exemplary embodiment, UAMM server 415 uses the received data and analysis the next time drone operator 202 applies for insurance for an unmanned drone mission 100.

Exemplary Computer-Implemented Method for Analyzing Unmanned Aerial Missions

Figure 3:
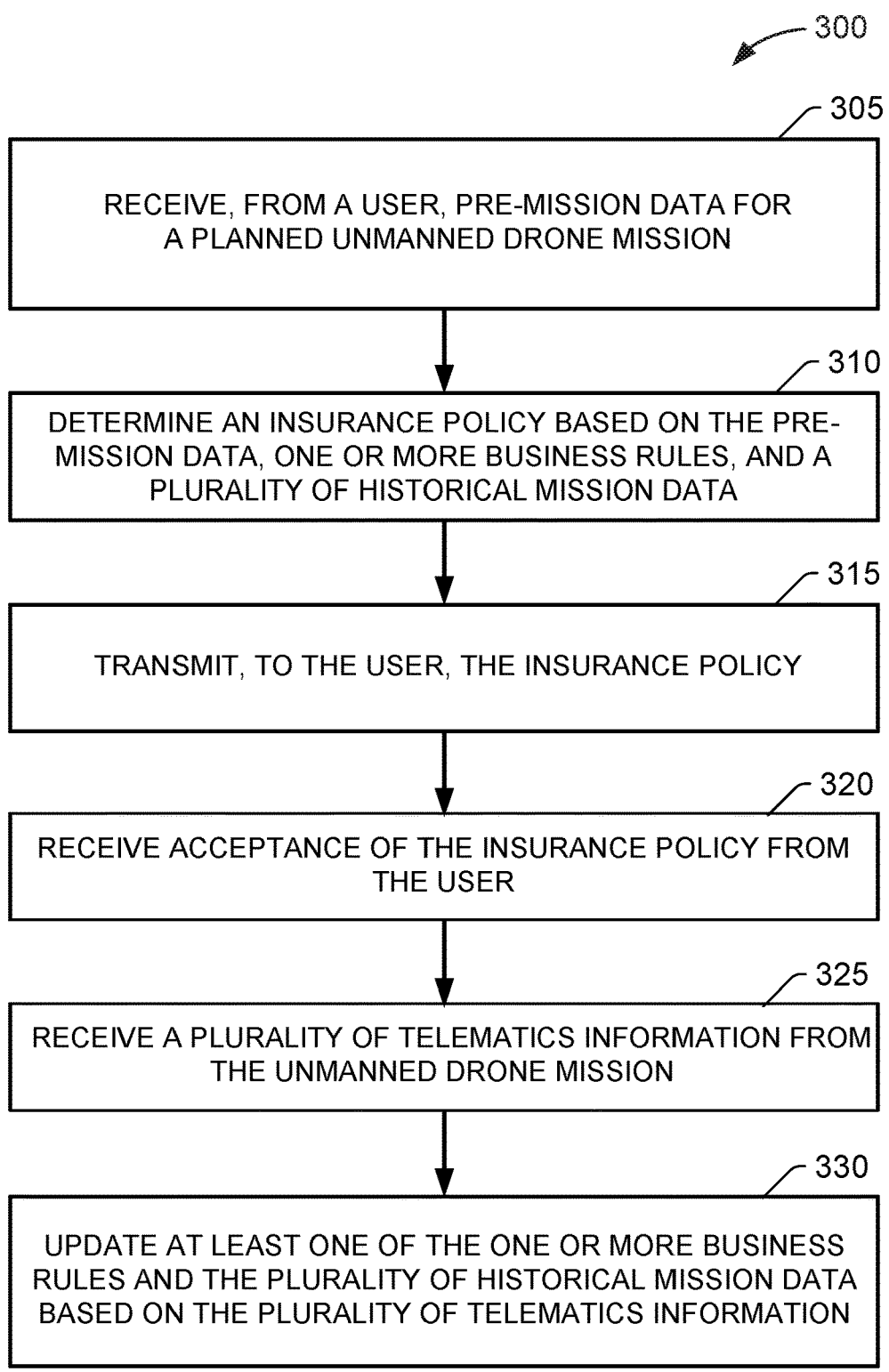
FIG. 3 illustrates a flow chart of an exemplary computer-implemented process for analyzing unmanned aerial missions shown in FIGS. 2A and 2B.

FIG. 3 illustrates a flow chart of an exemplary computer implemented process 300 for analyzing unmanned aerial missions as shown in FIG. 2. Process 300 may be implemented by a computing device, for example UAMM server 415 (shown in FIG. 4). In the exemplary embodiment, UAMM server 415 may be in communication with a user computer device 425 (shown in FIG. 4), such as drone controller 106 (shown in FIG. 1), an offsite monitor 114, such as telematics monitor computer device 430 and safety monitor computer device 435 (both shown in FIG. 4), and unmanned aerial system 104 (shown in FIG. 1).

In the exemplary embodiment, UAMM server 415 may receive 305 pre-mission data for a planned unmanned drone mission, such as mission 100 (shown in FIG. 1). UAMM server 415 may receive the pre-mission data from user computer device 425 associated with drone operator 202 (shown in FIG. 2A). In the exemplary embodiment, mission 100 may be a commercial mission, such as an agriculture survey. The pre-mission data includes information, such as, but not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information.

In the exemplary embodiment, UAMM server 415 determines 310 an insurance policy (and/or a usage-based or mission-based insurance premium or rate) based upon the pre-mission data, one or more business rules, and a plurality of historical mission data. In the exemplary embodiment, UAMM server 415 may store a plurality of mission data about past missions in database 420 (shown in FIG. 4). When determining 310 an insurance policy (and/or the usage-based or mission-based insurance premium or rate), UAMM server 415 may access the plurality of historical mission data. UAMM server 415 may compare the pre-mission data to the plurality of historical mission data to determine one or more missions of the same type of mission as that of the planned mission 100. In some embodiments, UAMM server 415 may just compare the stored mission types to the mission type provided in the planned mission data. In other embodiments, UAMM server 415 may determine the mission type for planned mission from the pre-mission data, where UAMM server 415 may profile the mission into a mission type based upon a plurality of data fields included in the pre-mission data. In some embodiments, UAMM server 415 may determine similar missions in the plurality of historical mission data to planned mission based upon other information in pre-mission data. In still further embodiments, UAMM server 415 may determine different sections of different missions to be similar to planned mission.

UAMM server 415 may also store a plurality of business rules. These business rules assist UAMM server 415 in determining the proper insurance policy (and/or a usage-based or mission-based insurance premium or rate) for the planned mission. In some embodiments, UAMM server 415 may have determined the one or more business rules based upon the plurality of historical mission data. In some embodiments, UAMM server 415 may also calculate a risk for the planned mission based at least in part on the pre-mission data and the plurality of historical missions. In these embodiments, UAMM server 415 may also use the calculated risk in determining 310 an insurance policy (and/or a usage-based or mission-based insurance premium or rate).

In the exemplary embodiment, UAMM server 415 transmits 315 the insurance policy (and/or a usage-based or mission-based insurance premium or rate) to drone operator 202 for approval. UAMM server 415 may receive 320 acceptance of the insurance policy (and/or the usage-based or mission-based insurance premium or rate) from drone operator 202. UAMM server may then issue the insurance policy to drone operator 202 for the planned mission.

In the exemplary embodiment, UAMM server 415 receives 325 a plurality of telematics information from the mission. In some embodiments, UAMM server 415 receives the telematics information from telematics monitor 206 (shown in FIG. 2) via telematics monitor computer device 430. The telematics information may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

In the exemplary embodiment, UAMM server 415 updates 330 at least one of the one or more business rules and the plurality of historical data based upon the plurality of telematics information. For example, UAMM server 415 may store the pre-mission data, the insurance policy, and the plurality of telematics information in database 420 with the plurality of historical data. In this example, UAMM server 415 may categorize the data based upon differences between the pre-mission data and the telematics data. In some embodiments, UAMM server 415 may also determine an updated risk (and/or a usage-based or mission-based insurance premium or rate) for the mission based upon how the mission turned out. UAMM server 415 may also change, delete, and/or add one or more business rules based upon one or more of the telematics information, the pre-mission data, the insurance policy (and/or the usage-based or mission-based insurance premium or rate), the plurality of historical information, and/or a comparison of one or more of the above.

In some embodiments, UAMM server 415 may also determine one or more safe operating guidelines based upon the plurality of historical mission data. The safe operating guidelines may be rules of operating an unmanned aerial system 104 or suggestions for how to operate an unmanned aerial system in a safe manner. For example, the operating guidelines may include a minimum safe distance to operate a UAS from power lines. The operating guidelines may also include environmental features to be aware of, such as suggested methods of operation in different weather conditions. In these embodiments, UAMM server 415 may determine the safe operating guidelines based upon accidents and their causes that are listed in the plurality of historical mission data.

In some further embodiments, UAMM server 415 may analyze the plurality of telematics information to determine that pilot 102 and UAS 104 complied with the safe operating guidelines during the mission. UAMM server 415 may determine one or more violations of the safe operating guidelines that occurred during the mission. In some embodiments, UAMM server 415 may determine a severity for each of the violations. In still further embodiments, UAMM server 415 may use the violations and/or severities to determine 310 a future insurance policy for drone operator 202 associated with that mission.

In some embodiments, UAMM server 415 may use the plurality of telematics information to generate a scenario model of a drone accident that occurred. Furthermore, UAMM server 415 may generate at least one insurance form based upon the scenario model. In these embodiments, UAMM server 415 retrieves one or more stored blank claim forms, such as from database 420. UAMM server 415 may then populate one or more of the blank fields of the retrieved blank forms based upon the scenario model. Based upon the completeness of the stored scenario model, UAMM server 415 may be able to fill out multiple forms and describe the accident in detail. UAMM server 415 may also be able to determine one or more damages that UAS 104 would have incurred in the drone accident. UAMM server 415 may also be able to estimate a cost of repairs or replacement.

Exemplary Computer Network

FIG. 4 depicts a simplified block diagram of an exemplary system 400 for implementing process 200 shown in FIGS. 2A and 2B. In the exemplary embodiment, system 400 may be used for analyzing unmanned aerial missions, calculating risk for aerial missions, and determining drone operation rules. As described below in more detail, an unmanned aerial mission monitoring ("UAMM") server 415 may be configured to receive, from a user (such as drone operator 202 shown in FIG. 2A), pre-mission data for a planned unmanned aerial mission, determine an insurance policy (and/or a usage-based or mission-based insurance premium or rate) based upon the pre-mission data, one or more business rules, and a plurality of historical mission data, transmit, to drone operator 202, the insurance policy (and/or a usage-based or mission-based insurance premium or rate), receive acceptance of the insurance policy (and/or the usage-based or mission-based insurance premium or rate) from drone operator 202, receive a plurality of telematics information from the unmanned aerial mission, and update at least one of the one or more business rules and the plurality of historical mission data based upon the plurality of telematics information.

In the exemplary embodiment, user computer devices 425 are computers that include a web browser or a software application, which enables user computer devices 425 to access UAMM server 415 using the Internet or other network. More specifically, user computer devices 425 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 425 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 425 is also drone controller 106, shown in FIG. 1. In other embodiments, user computer device 425 is associated with drone operator 202.

A database server 410 may be communicatively coupled to a database 420 that stores data. In one embodiment, database 420 may include pre-mission data, telematics data, historical mission data, business rules, and insurance policies. In the exemplary embodiment, database 420 may be stored remotely from UAMM server 415. In some embodiments, database 420 may be decentralized. In the exemplary embodiment, drone operator 202 may access database 420 via user computer device 425 by logging onto UAMM server 415, as described herein.

UAMM server 415 may be communicatively coupled with one or more user computer devices 425. UAMM server 415 may also be communicatively coupled with at least one safety monitor computer device 435 and/or at least one telematics monitor computer device 430. In some embodiments, UAMM server 415 may be associated with, or is part of a computer network associated with an insurance provider, or in communication with the insurance provider's computer network (not shown). In other embodiments, UAMM server 415 may be associated with a third party and is merely in communication with the insurance provider's computer network.

Safety monitor computer devices 435 and/or telematics monitor computer devices 430 may be communicatively coupled with UAMM server 415 through the Internet or a cellular network. In the exemplary embodiment, safety monitor computer devices 435 and/or telematics monitor computer devices 430 are computers that include a software application, which enables safety monitor computer devices 435 and/or telematics monitor computer devices 430 to access UAMM server 415 using the Internet or other network. More specifically, safety monitor computer devices 435 and/or telematics monitor computer devices 430 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

In the example embodiment, telematics monitor computer device 430 may be in communication with UAS 104. In some embodiments, telematics monitor computer device 430 may be in direct communication with UAS 104. In other embodiments, telematics monitor computer device 430 may communicates with UAS 104 through drone controller 106. In the exemplary embodiment, telematics monitor computer devices 430 are computers that include a software application, which enables telematics monitor computer device 430 to access UAS 104 using the Internet or other network. More specifically, telematics monitor computer device 430 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Telematics monitor computer device 430 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the example embodiment, safety monitor computer devices 435 may be in communication with UAS 104. In some embodiments, safety monitor computer devices 435 may be in direct communication with UAS 104. In other embodiments, safety monitor computer devices 435 may communicates with UAS 104 through drone controller 106. In the exemplary embodiment, safety monitor computer devices 435 are computers that include a software application, which enables safety monitor computer devices 435 to access UAS 104 using the Internet or other network. More specifically, safety monitor computer devices 435 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Safety monitor computer devices 435 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Exemplary Client Device

Figure 5:
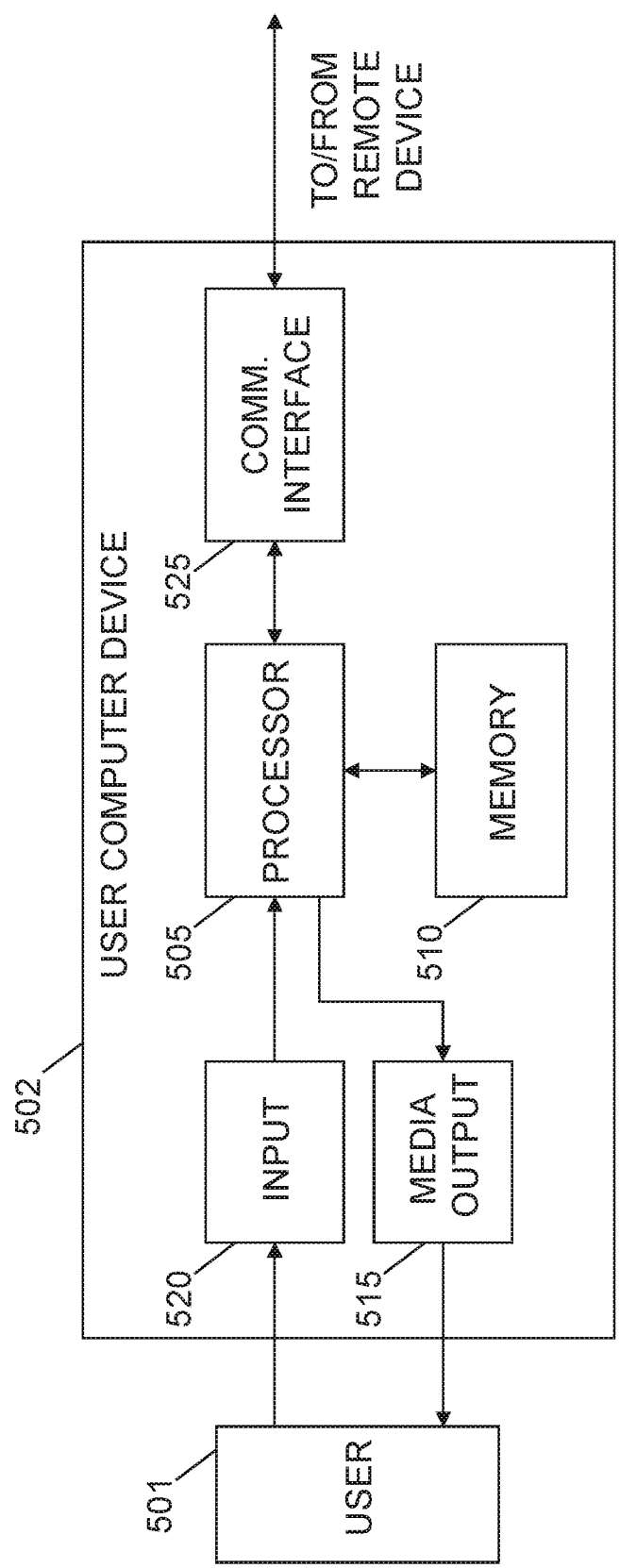
FIG. 5 illustrates an exemplary configuration of a client computer device shown in FIG. 4, in accordance with one embodiment of the present disclosure.

FIG. 5 depicts an exemplary configuration of user computer device 425 shown in FIG. 4, in accordance with one embodiment of the present disclosure. User computer device 502 may be operated by a user 501. In the exemplary embodiment, user 501 may be similar to drone controller 106 (shown in FIG. 1). User computer device 502 may include, but is not limited to, user computer devices 425, safety monitor computer device 435, telematics monitor computer device 430 (all shown in FIG. 4, drone controller 106, and offsite monitor 114 (both shown in FIG. 1). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, select and/or enter one or more items to purchase and/or a purchase request, or to access credential information, and/or payment information.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as UAMM server 415 (shown in FIG. 4), UAS 104 (shown in FIG. 1), or offsite monitor 114. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from UAMM server 415. A client application allows user 501 to interact with, for example, UAMM server 415. For example, instructions may be stored by a cloud service, and the output of the execution of the instructions sent to the media output component 515.

Exemplary Server Device

Figure 6:
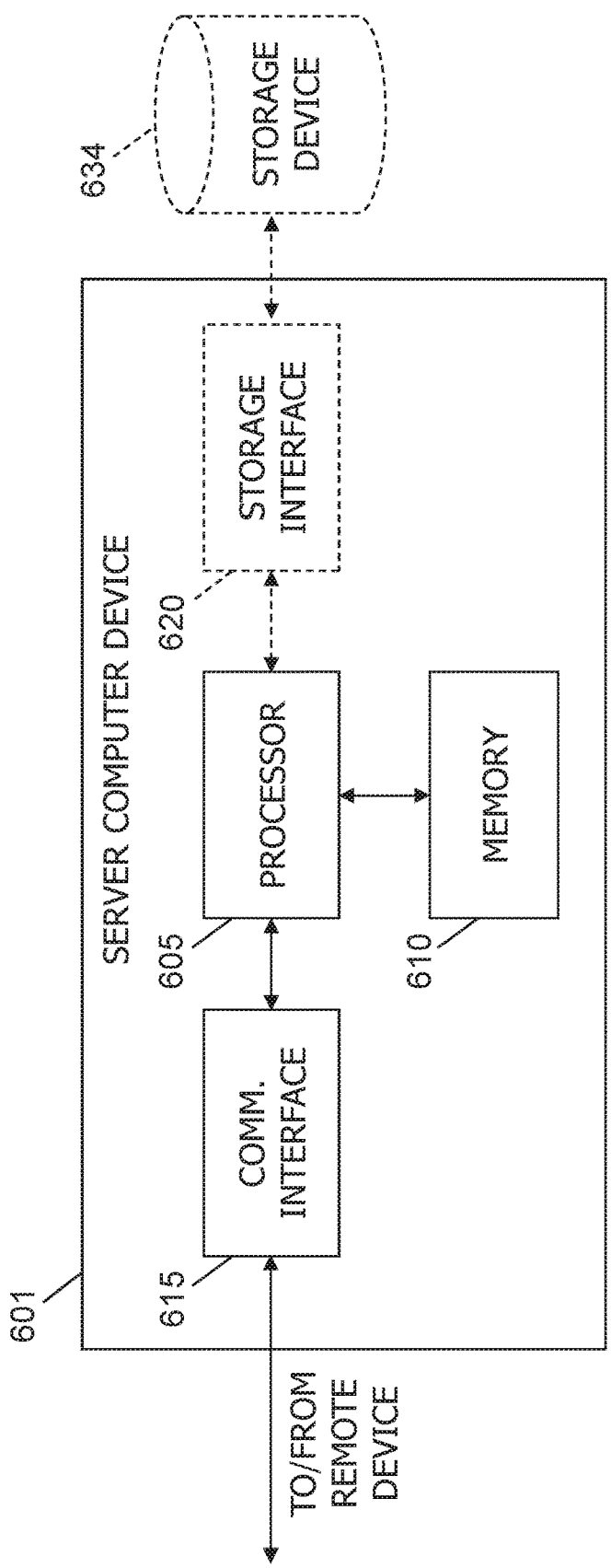
FIG. 6 illustrates an exemplary configuration of a server shown in FIG. 4, in accordance with one embodiment of the present disclosure.

FIG. 6 depicts an exemplary configuration of server 415 shown in FIG. 4, in accordance with one embodiment of the present disclosure. Server computer device 601 may include, but is not limited to, UAMM server 415, telematics monitor computer device 430, safety monitor computer device 435, database server 410 (all shown in FIG. 4), and offsite monitor 114 (shown in FIG. 1). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, UAS 104 (shown in FIG. 1), drone controller 106 (shown in FIG. 1), UAMM server 415, database server 410, safety monitor computer device 435, telematics monitor computer device 430, and user computer device 425 (shown in FIG. 4). For example, communication interface 615 may receive requests from user computer devices 425 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 3 and 7.

Exemplary Computer-Implemented Method for Determining Drone Operation Rules

Figure 7:
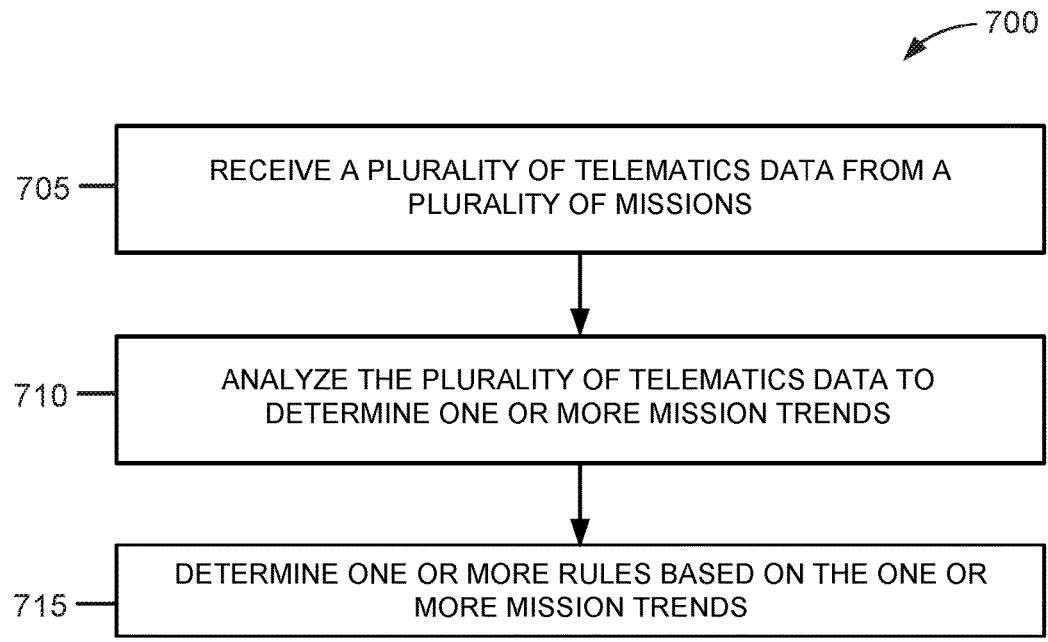
FIG. 7 illustrates a flow chart of an exemplary computer-implemented process of determining drone operation rules using the system shown in FIG. 4.

FIG. 7 illustrates a flow chart of an exemplary computer implemented process 700 for determining drone operation rules using system 400 shown in FIG. 4. Process 700 may be implemented by a computing device, for example UAMM server 415 (shown in FIG. 4). In the exemplary embodiment, UAMM server 415 may be in communication with a user computer device 425 (shown in FIG. 4), such as drone controller 106 (shown in FIG. 1), an offsite monitor 114, such as telematics monitor computer device 430 and safety monitor computer device 435 (both shown in FIG. 4), and unmanned aerial system 104 (shown in FIG. 1).

In the exemplary embodiment, UAMM server 415 may receive 705 a plurality of telematics data from a plurality of missions. In the exemplary embodiment, each mission of the plurality of missions was a commercial, unmanned aerial mission that had been performed in the past. The telematics information may be stored in database 420 (shown in FIG. 4). In some embodiments, UAMM server 415 may receive 705 the telematics data from telematics monitor computer device 430. The telematics information may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

UAMM server 415 analyzes 710 the plurality of telematics data to determine one or more trends. UAMM server 415 determines 715 one or more rules based upon the one or more mission trends.

In some embodiments, UAMM server 415 may determine at least one mission type based upon the plurality of telematics data. UAMM server 415 may calculate a risk profile for each mission type based upon the one or more trends and the plurality of telematics data. In some further embodiments, UAMM server 415 may generate an insurance policy template for each of the mission types based upon the telematics information, the determined one or more rules, and/or past insurance policies, especially any insurance policies associated with any of the missions included in the telematics data. In some further embodiments, UAMM server 415 may determine one or more guidelines for safe drone operations based upon the one or more trends and/or the one or more rules. In these embodiments, UAMM server 415 may transmit the one or more guidelines to drone operators 202 who request insurance policies for unmanned aerial missions.

Figure 8:
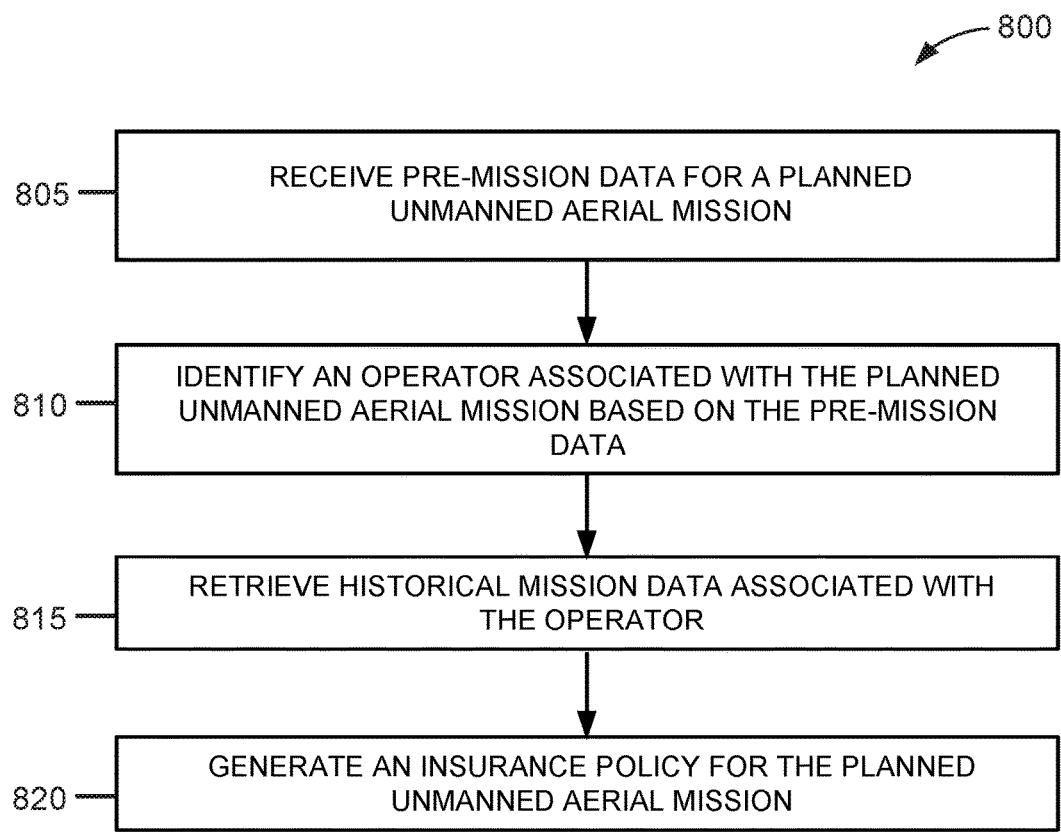
FIG. 8 illustrates a flow chart of an exemplary computer-implemented process of generating policies for unmanned aerial missions using the system shown in FIG. 4.

Exemplary Computer-Implemented Method for Generating Policies for Unmanned Aerial Missions FIG. 8 illustrates a flow chart of an exemplary computer implemented process 800 for generating policies for unmanned aerial missions using system 400 shown in FIG. 4. Process 800 may be implemented by a computing device, for example UAMM server 415 (shown in FIG. 4). In the exemplary embodiment, UAMM server 415 may be in communication with a user computer device 425 (shown in FIG. 4), such as drone controller 106 (shown in FIG. 1), an offsite monitor 114, such as telematics monitor computer device 430 and safety monitor computer device 435 (both shown in FIG. 4), and unmanned aerial system 104 (shown in FIG. 1).

In the exemplary embodiment, UAMM server 415 may receive 805 pre-mission data for a planned unmanned drone mission, such as mission 100 (shown in FIG. 1). UAMM server 415 may receive the pre-mission data from user computer device 425 associated with drone operator 202 (shown in FIG. 2A), such as via wireless communication or data transmission over one or more radio frequency links or communication channels. In the exemplary embodiment, mission 100 may be a commercial mission, such as an agriculture survey, or even a non-commercial mission. The pre-mission data includes information, such as, but not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information.

In the exemplary embodiment, UAMM server 415 identifies 810 an operator associated with the planned unmanned aerial mission based upon the pre-mission data. In some embodiments, the pre-mission data personally identifies the operator. In other embodiments, the operator is identified based upon years of experience, a number of missions flown, or some other information about the operator's skill level. In some embodiments, the operator is pilot 102 (shown in FIG. 1) of UAS 104. In other embodiments, the operator is a team of pilots 102 of UAS 104. In still further embodiments, the operator is a company associated with UAS 104.

In the exemplary embodiment, UAMM server 415 retrieves 815 historical mission data associated with the identified operator from database 420 (shown in FIG. 4). For example, in the embodiments where the operator is an individual pilot 102, UAMM server 415 may retrieve 815 information about past missions that pilot 102 has operated. In the exemplary embodiment, UAMM server 415 stores a plurality of historical mission data in database 420. This historical mission data may be from where UAMM server 415 receives a plurality of mission data from a mission after the mission was performed. In this embodiment, UAMM server 415 updates that historical mission data based upon the received plurality of mission data. The mission data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

In the exemplary embodiment, UAMM server 415 may calculate or estimate a level of risk or drone collision risk based upon the retrieved historical data and the received pre-mission data. The level of risk calculated may also include a risk of mission failure, risk of cargo loss, and/or risk that the drone will be unrecoverable or otherwise damaged during the mission.

In the exemplary embodiment, UAMM server 415 generates 820 an insurance policy (and/or a usage-based or mission-based insurance premium or rate) based upon (i) the retrieved historical data, (ii) the received pre-mission data, and/or (iii) level of risk or drone collision risk calculated. In the exemplary embodiment, UAMM server 415 transmits the insurance policy (and/or a usage-based or mission-based insurance premium or rate) to drone operator 202, such as via wireless communication or data transmission sent to the operator's mobile device over one or more radio frequency links or digital communication channels, for approval. UAMM server 415 may receive acceptance of the insurance policy (and/or the usage-based or mission-based insurance premium or rate) from drone operator 202, such as via wireless communication or data transmission over one or more radio links or communication channels received from the operator's mobile device. UAMM server may then issue the insurance policy to drone operator 202 for the planned mission.

In some embodiments, UAMM server 415 may receive the plurality of mission data from one or more sensors attached to UAS 104. In some further embodiments, the one or more sensors are removably attached to UAS 104. In these embodiments, the one or more sensors may be included in a self-contained device that monitors the operation of UAS 104 and is attached to UAS 104 for the unmanned aerial mission. In these embodiments, the device may be associated with offsite monitor 114, safety monitor computer device 435, or telematics computer device 430. In these embodiments, the device may transmit sensor data to UAMM server 415 through at least one of offsite monitor 114, safety monitor computer device 435, and telematics computer device 430.

In some further embodiments, UAMM server 415 may analyze the plurality of mission data to determine that pilot 102 and UAS 104 complied with the safe operating guidelines during the mission. UAMM server 415 may determine one or more violations of the safe operating guidelines that occurred during the mission. In some embodiments, UAMM server 415 may determine a severity for each of the violations. In still further embodiments, UAMM server 415 may use the violations and/or severities to generate 820 a future insurance policy or usage-based rate for drone operator 202 associated with that mission, and/or adjust or update a risk profile (or operator profile) associated with the operator.

In some embodiments, UAMM server 415 may determine at least one mission type based upon the pre-mission data. UAMM server 415 may retrieve historical mission data associated with the identified mission type from database 420 (shown in FIG. 4). For example, the mission type may be an agricultural survey mission. In this example, UAMM server 415 analyzes previous agricultural survey missions to assist in generating the insurance policy.

For example, in the embodiments where the operator is an individual pilot 102, UAMM server 415 may retrieve 815 information about past missions that pilot 102 has operated. In the exemplary embodiment, UAMM server 415 stores a plurality of historical mission data in database 420. This historical mission data may be from where UAMM server 415 receives a plurality of mission data from a mission after the mission was performed. In this embodiment, UAMM server 415 updates that historical mission data based upon the received plurality of mission data.

Exemplary Computer Device

Figure 9:
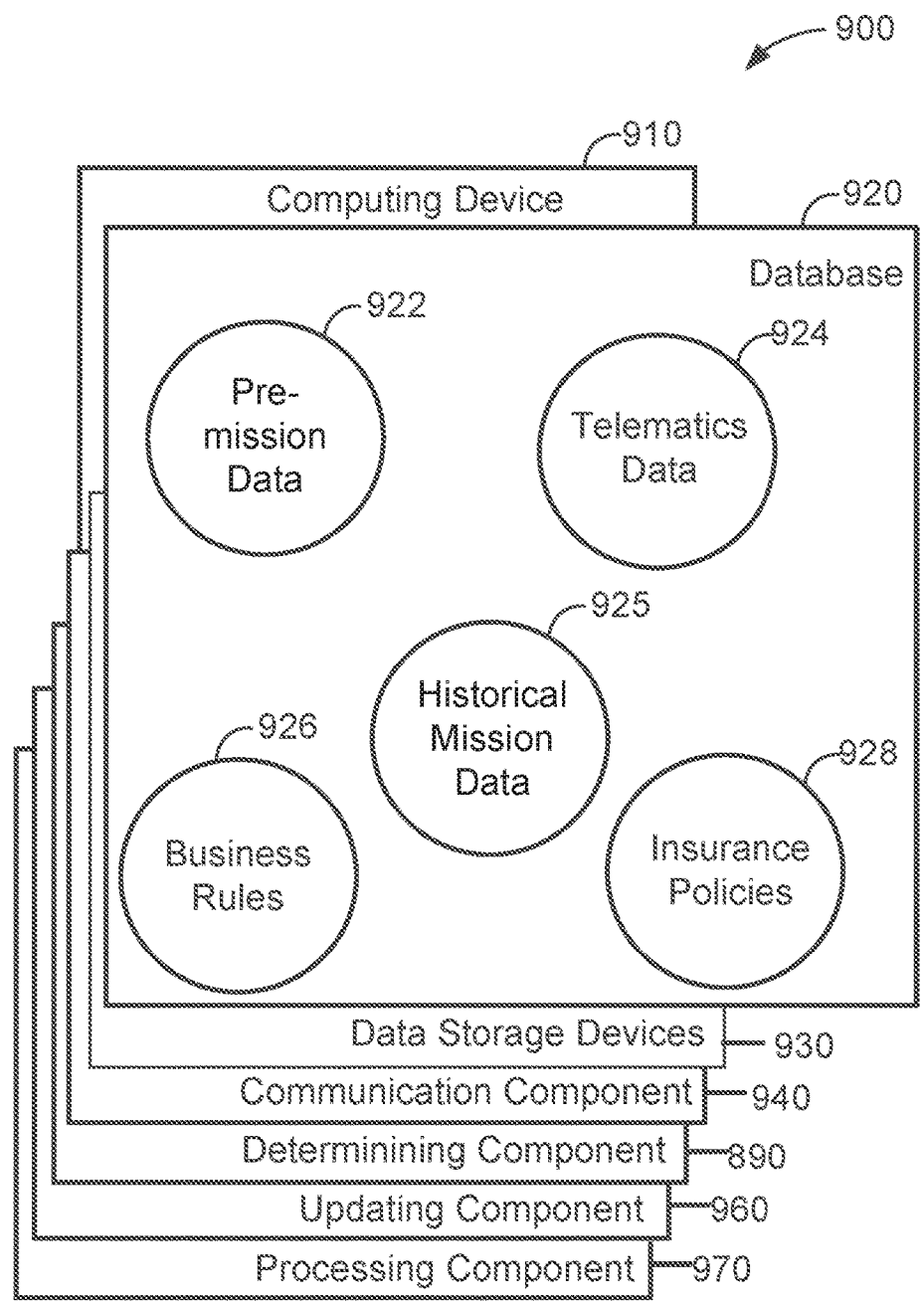
FIG. 9 illustrates a diagram of components of one or more exemplary computing devices that may be used in the system shown in FIG. 4.

FIG. 9 depicts a diagram 900 of components of one or more exemplary computing devices 910 that may be used in system 400 shown in FIG. 4. In some embodiments, computing device 910 may be similar to UAMM server 415 (shown in FIG. 2). Database 920 may be coupled with several separate components within computing device 910, which perform specific tasks. In this embodiment, database 90 may include pre-mission data 922, telematics data 924, historical mission data 925, business rules 926, and/or insurance policies (including usage-based or mission-based insurance premiums or rates) 928. In some embodiments, database 920 is similar to database 920 (shown in FIG. 4).

Computing device 910 may include the database 920, as well as data storage devices 930. Computing device 910 may also include a communication component 940 for receiving 305 pre-mission data, transmitting 315 the insurance policy, receiving 320 acceptance, and receiving 325 a plurality of telematics information (all shown in FIG. 3). Computing device 910 may further include a determining component 950 for determining 310 an insurance policy (shown in FIG. 3). Moreover, computing device 910 may include an updating component 960 for updating at least one business rule (shown in FIG. 3). A processing component 970 may assist with execution of computer-executable instructions associated with the system.

EXEMPLARY EMBODIMENTS & FUNCTIONALITY

In one aspect, a computer system for analyzing unmanned aerial missions may be provided. The computer system may include at least one processor in communication with at least one memory device. The at least one processor may be configured or programmed to: (1) receive, from a user, pre-mission data for a planned unmanned aerial mission; (2) determine an insurance policy (and/or a usage-based or mission-based insurance premium or rate) based upon the pre-mission data, one or more business rules, and/or a plurality of historical mission data; (3) transmit, to the user, the insurance policy (and/or the usage-based or mission-based insurance premium or rate); (4) receive acceptance of the insurance policy (and/or the usage-based or mission-based insurance premium or rate) from the user; (5) receive a plurality of telematics information from the unmanned aerial mission; and/or (6) update at least one of the one or more business rules and the plurality of historical mission data based upon the plurality of telematics information to facilitate quickly and accurately processing insurance policies for unmanned aerial missions.

A further enhancement may be where the computer system may determine one or more safe operating guidelines based upon the plurality of historical mission data. The computer system may then compare the plurality of telematics information to the one or more safe operating guidelines to determine if there were any violations of the safe operating guidelines during the unmanned aerial mission. The computer system may adjust a future insurance policy for the user based upon if there were any determined violations.

The computer system may achieve the above results by storing a plurality historical mission data based upon a plurality of unmanned aerial missions. The computer system may use the plurality of historical mission data to determine the one or more business rules.

The computer system may achieve the above results by including a type of mission in the pre-mission data. The computer system may also compare the pre-mission data to the plurality of historical mission data to determine one or more missions of the plurality of historical mission data of the same type of mission as the pre-mission data. The computer system may then determine the insurance policy (and/or a usage-based or mission-based insurance premium or rate) based upon the determined one or more missions.

The computer system of claim 1, wherein the pre-mission data may include, but is not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information.

A further enhancement may be where the computer system may receive the plurality of telematics data from a computer device associated with a telematics monitoring service, instead of from the drone user or the drone itself. The plurality of telematics information, may include, for example, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

A further enhancement may be where the computer system may generate a scenario model of a drone accident based upon the plurality of telematics data. The computer system may also generate at least one insurance claim form based upon the scenario model.

Another enhancement may where the computer system calculates a risk for the unmanned aerial mission based, at least in part on, the pre-mission data and the plurality of historical mission data. The computer system may use this risk in determining the appropriate insurance policy or the details of the insurance policy.

The planned unmanned aerial mission described herein may be a commercial mission.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device or vehicle from device details, mobile device sensors, geolocation information, image data, and/or other data.

In one embodiment, a processing element may be trained by providing it with a large sample of telematics information with known characteristics or features. Such information telematics information may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify the type of unmanned mission that is planned based upon minimal information or despite a misclassification by a user. The processing element may also learn how to identify different types of accidents, system errors, and vehicular crashes based upon differences in the received sensor data. The processing element may further learn how to recreate an accident based upon partial or incomplete information and determine a level of certainty that the recreation is correct. As a result, at the time of receiving accident data, providing automated reconstruction of a drone-based vehicular accident, providing automated population of insurance claim forms, and/or determining warning signs about the likelihood that an accident will occur in the future.

ADDITIONAL EXEMPLARY EMBODIMENTS

In still another aspect, a computer system for determining drone operation rules may be provided. The computer system may include at least one processor, sensor, and/or transceiver in communication with at least one memory device, the at least one processor, sensor, and/or transceiver. The at least one processor may be programmed to (1) receive a plurality of telematics data from a plurality of missions; (2) analyze the plurality of telematics data to determine one or more mission trends; and (3) determine one or more rules based upon the one or more mission trends to facilitate accurately determining operational procedures for drone missions. The computer system may have additional, less, or alternate functionality, including that discussed elsewhere herein.

A further enhancement may be where the computer system may determine at least one mission type based upon the plurality of telematics data. The computer system may calculate a risk profile for the at least one mission type based upon the one or more mission trends. The computer system may further generate an insurance policy template for the at least one mission type based upon the plurality of telematics data and the determined one or more rules. Additionally or alternatively, the computer system may generate an insurance policy, and/or a usage-based or mission-based insurance premium or rate based upon the risk profile, the mission type, mission trends, operator identification, etc.

A further enhancement may be where the computer system may determine one or more guidelines for safe mission operation based upon the one or more trends. The computer system may also transmit the one or more guidelines at least one user associated with a future mission.

For instance, the plurality of telematics data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

In yet another aspect, a computer system for generating policies for unmanned aerial missions may be provided. The computer system may include at least one processor in communication with at least one memory device. The at least one processor is programmed to (1) receive pre-mission data for a planned unmanned aerial mission; (2) identify an operator associated with the planned unmanned aerial mission based upon the pre-mission data; (3) retrieve historical mission data associated with the operator; (4) calculate a level of risk for the planned unmanned aerial mission based upon the historical mission data and the pre-mission data; and/or (5) generate a usage-based insurance rate or premium, and/or an insurance policy, for the planned unmanned aerial mission based upon the retrieved historical mission data, the pre-mission data, and/or the level or risk calculated. The computer system may have additional, less, or alternate functionality, including that discussed elsewhere herein.

For instance, a further enhancement may be where the computer system may transmit the insurance policy to the user's mobile device and receive acceptance from the user's mobile device. The computer system may receive a plurality of mission data from the planned unmanned aerial mission after performance of the planned unmanned aerial mission. The computer system may update the historical mission data based upon the received plurality of mission data. The computer system may receive the plurality of mission data from one or more sensors associated with the unmanned aerial system that performed the planned unmanned aerial mission. The one or more sensors may be removably attached to the unmanned aerial system.

Another further enhancement may be where the computer system may compare the plurality of mission data to the one or more safe operating guidelines to determine if there were any violations of the safe operating guidelines during the unmanned aerial mission. The computer system may adjust a future insurance policy for the user based upon if there were any determined violations.

The operator described herein may be a pilot of the unmanned aerial system, a team of pilots of the unmanned aerial system, and a company associated with the unmanned aerial system.

A yet further embodiment may be where the computer system may be configured to determine a mission type of the planned unmanned aerial mission based upon the pre-mission data. The computer system may retrieve historical mission data associated with the determined mission type. Then the computer system may generate the insurance policy for the planned unmanned aerial mission based upon the pre-mission data, the historical mission data associated with the operator, and the historical mission data associated with the mission type. The computer system may store the plurality historical mission data based upon a plurality of unmanned aerial missions.

For instance the pre-mission data may include, but is not limited to, mission type, flight time, time of day, flight path, drone model, drone software versions, drone maintenance schedule, drone maintenance history, payload information, system weight, drone map versions, drone collision avoidance systems installed, battery information, potential weather conditions, mission location, adherence to airspace restrictions, and operator information.

The plurality of mission data may include, but is not limited to, human or automated operation, operator ide identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone. The planned unmanned aerial mission described herein may be a commercial mission.

Exemplary Usage-Based Insurance Embodiments

The emerging risk of commercial drone operations presents challenges to insurers to quantify and thereby offer appropriately priced coverage to this sector. The competitive advantage lies in entering this market in its infancy and employing a usage-based insurance (UBI) solution to gather valuable data and gain actuarial experience in the commercial unmanned aerial systems (UAS) market. Onboard UAS sensors collect information which may provide valuable insight on the risk environment.

The UBI solution may require users to file for a policy and a quote for every individual mission that the user plans. As the user only pays for the missions that the user has performed, the user is only paying for use of the unmanned aerial system. In some embodiments, the UBI solution may also be known as a pay as you fly or pay as you operate solution. The UBI solution may provide for providing insurance coverage for individual or particular drone missions based upon type of missions, type of drone, drone characteristics, operator qualifications, etc. as discussed elsewhere herein.

The present embodiments may employ a UBI solution to gather valuable data and gain actuarial experience in the commercial UAS market. Operating in a manner similar to auto telematics, flight data may be collected and used for rating purposes. The present embodiments may also establish periodic reporting guidelines where the insured will share their flight data, and operational information to provide additional and ongoing insights into this emerging risk. There is potential to partner with a $3^{rd}$ party to ensure operators adhere to flight and operations safety standards.

In the present embodiments, the UBI solution may generate variable quotes for unmanned aerial missions based upon a variety of factors, such as, but not limited to, mission type, mission location, and operator information. For example, a more experienced operator may generate a lower price quote than a less experienced operator. In some embodiments, how experienced the operator is in the particular type of mission may affect the price quote. For example, a first operator with more overall experience may have a higher price quote than a second operator with more experience with the particular mission type. Other factors, such as, but not limited to, how often the individual operator has operated unmanned aerial systems in the particular location, the amount of experience that the individual operator has with that particular type of unmanned aerial system or drone may affect the price of the quote as well.

In some further embodiments, a collection of telematics information from unmanned aerial systems that the operator has piloted may also include information about whether the operator is a safe operator or just been lucky so far. Safety issues may include, but are not limited to, how much charge was left in the battery upon completion of the mission, any accidents in the past, past damage claims, compliance with safety protocols, distance from no fly zones, average flying altitude, and other factors that may allow the systems described here to determining the potential risks with this operator.

There may be external and internal devices that may be used to log telemetry positioning while in flight, collecting information such as latitude, longitude, number of satellites, speed, acceleration, battery voltage, heading, altitude, flight time, and time of day. A cloud storage solution could be used to store and share data with a $3^{rd}$ party, such as an insurer. Telematics data may provide insights on the activities or aggregate activities most associated with claims filed against the policy, and may be used for future underwriting analysis of risk. A dynamic rating model may be generated for customized pricing based upon use characteristics of the insured.

The present embodiments may use data collected from these UAS sensors and periodic reports for the following purposes: (1) To identify occurrence of an accident, store relevant data and use this data to generate a reconstruction of the accident as it occurred, such as: (a) Determination of whether vehicle was being operated by human, by automated flying or a combination of both; (b) System failures: (i) Vehicle (maintenance, parachute or other safety systems); (ii) Sensors (collision avoidance, deconfliction systems—NASA (UTM) Unmanned Traffic Management, etc.); and (iii) Software (latest version, security protocols, vulnerabilities, etc.); (c) Human error: (i) Failure to respond to warnings, alerts; and (ii) Overriding automated modes or safety interventions; (d) Reconstruction may not only depict the scene visually, but may also incorporate other relevant data to include: (i) Data from the host vehicle, such as on-board telemetry, diagnostics data, and other relevant info; and (ii) Data about other vehicles, obstacles and other relevant objects external to the host vehicle.

The present embodiments may also (2) identify risk factors for insurance rating purposes such as: (a) Airspace adherence; (b) Flight time/length; (c) Time of day for flight operations; (d) Flight path; (e) Software versions (updated regularly); (f) Maintenance schedule; (g) Map versions (updated regularly); (h) Collision avoidance/deconfliction systems; (i) Batteries—battery life/usage limits; transportation of batteries; inspection; documentation of battery cycles; and/or (j) Human element—understanding of who the operator is; level of training; hours operating (experience).

The present embodiments relate to the development of a UBI solution for UAS service providers. Flight data may be collected and used for rating purposes. Dynamic rating capabilities using UAS sensor data, security levels, software updates, mapping, etc. do not exist today.

In one aspect, a computer system for determining drone operation rules may be provided. The computer system may include at least one processor in communication with at least one memory device. The at least one processor may be programmed to: (1) receive drone operator identification, such as via a biometric device or feature (such as via wireless communication or data transmission over one or more radio links or wireless communication channels from the drone operator's mobile device); (2) receive mission parameters/details (or a type of mission) for a planned or upcoming drone mission (such as via wireless communication or data transmission over one or more radio links or wireless communication channels from the drone operator's mobile device); (3) receive or retrieve (such as with the drone operator's permission or affirmative consent) drone telematics data from a plurality of past missions associated with the drone operator operating a drone; (4) analyze the drone telematics data to determine a usage-based or mission-based insurance premium or rate for the drone operator; and/or (5) transmit the usage-based or mission-based insurance premium or rate to the drone operator's mobile device for the drone operator's review and approval to facilitate providing usage-based or mission-based insurance to drone operators and/or owners.

The processor may be further configured to calculate a risk profile for the drone operator based upon drone telematics data. For instance, with the drone operator's permission or affirmative consent, their past drone telematics data or other data associated with their operation of drones may analyzed. In return, low risk or risk adverse drone operators may receive insurance discounts or lower insurance rates.

The processor may be further configured to calculate a risk profile for the type of drone mission using historical drone telematics data. The processor may be further configured to determine one or more guidelines for safe mission operation based upon the drone telematics data. The processor may be further configured to transmit the one or more guidelines to the drone operator for the type of mission planned. The drone telematics data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone. The computer system may include additional, less, or alternate functionality, including that discussed elsewhere herein.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for determining drone operation rules, the computer system including at least one processor in communication with at least one memory device, the at least one processor is programmed to:
   receive a plurality of telematics data from a plurality of missions including one or more missions associated with drone accidents;
   analyze the plurality of telematics data to determine one or more mission trends including the drone accidents;
   generate, based on the plurality of telematics data, a scenario model of a drone accident that occurred, the scenario model comprising at least one cause of the accident;
   determine one or more guidelines for safe mission operation based upon the one or more mission trends, the accident, the scenario model, and the at least one cause; and
   transmit the one or more guidelines for safe mission operation to at least one user associated with a future mission.

2. The computer system of claim 1, wherein the processor is further configured to determine at least one mission type based upon the plurality of telematics data.

3. The computer system of claim 2, wherein the processor is further configured to calculate a risk profile for the at least one mission type based upon the one or more mission trends.

4. The computer system of claim 2, wherein the processor is further configured to generate at least one of an insurance policy template, a usage-based or mission-based insurance premium, and a usage-based or mission-based insurance rate for the at least one mission type based upon the plurality of telematics data and the determined one or more trends.

5. The computer system of claim 1, wherein each mission of the plurality of missions was an unmanned aerial drone mission.

6. The computer system of claim 1, wherein the plurality of telematics data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

7. The computer system of claim 1, wherein the processor is further configured to:
   receive telematics data associated with the future mission;
   analyze the telematics data to determine if the user operated based on the one or more guidelines; and
   determine whether or not to issue a policy for a second future mission based on the determination.

8. The computer system of claim 1, wherein the one or more guidelines include one or more of a recommended distance from a safety hazard, environmental features to be aware of, and methods of operation in different weather conditions.

9. A computer-based method for determining drone operation rules, the method implemented on an unmanned aerial mission monitoring ("UAMM") server including at least one processor in communication with at least one memory device, the method comprising:
   receiving, at the UAMM server, a plurality of telematics data from a plurality of missions including one or more missions associated with drone accidents;
   analyzing, by the UAMM server, the plurality of telematics data to determine one or more mission trends including the drone accidents;
   generating, based on the plurality of telematics data, a scenario model of a drone accident that occurred, the scenario model comprising at least one cause of the accident;
   determining, by the UAMM server, one or more guidelines for safe mission operation based upon the one or more mission trends, the accident, the scenario model, and the at least one cause; and
   transmitting the one or more guidelines to at least one user associated with a future mission.

10. The method of claim 9 further comprising determining at least one mission type based upon the plurality of telematics data.

11. The method of claim 10 further comprising calculating a risk profile for the at least one mission type based upon the one or more mission trends.

12. The method of claim 10 further comprising generating at least one of an insurance policy template, a usage-based or mission-based insurance premium, and a usage-based or mission-based insurance rate for the at least one mission type based upon the plurality of telematics data and the determined one or more trends.

13. The method of claim 9, wherein each mission of the plurality of missions was an unmanned aerial drone mission.

14. The method of claim 9, wherein the plurality of telematics data may include, but is not limited to, human or automated operation, operator identification, speed information, altitude information, any vehicle failures during the mission, any sensor failures during the mission, any software failures during the mission, any failure to respond to at least one of warnings and alerts, any overrides of automated modes, any safety interventions, on-board telemetry, diagnostics data, and data about any relevant objects external to the drone.

15. At least one non-transitory computer-readable storage media having computer-executable instructions embodied thereon, wherein when executed by at least one processor, the computer-executable instructions cause the processor to:
- receive a plurality of telematics data from a plurality of missions including one or more missions associated with drone accidents;
- analyze the plurality of telematics data to determine one or more mission trends including the drone accidents;
- generate, based on the plurality of telematics data, a scenario model of a drone accident that occurred, the scenario model comprising at least one cause of the accident;
- determine one or more guidelines for safe mission operation based upon the one or more mission trends, the accident, the scenario model, and the at least one cause; and
- transmit the one or more guidelines to at least one user associated with a future mission.

16. The computer-readable storage media of claim 15, wherein the computer-executable instructions further cause the processor to determine at least one mission type based upon the plurality of telematics data.

17. The computer-readable storage media of claim 16, wherein the computer-executable instructions further cause the processor to calculate a risk profile for the at least one mission type based upon the one or more mission trends.

18. The computer-readable storage media of claim 16, wherein the computer-executable instructions further cause the processor to generate at least one of an insurance policy template, a usage-based or mission-based insurance premium, and a usage-based or mission-based insurance rate for the at least one mission type based upon the plurality of telematics data and the determined one or more trends.

* * * * *